(12) United States Patent
Bräuer et al.

(10) Patent No.: US 9,458,277 B2
(45) Date of Patent: Oct. 4, 2016

(54) HOMOGENEOUS EXTRUDED ARTICLES MADE FROM THERMOPLASTICALLY PROCESSABLE POLYURETHANES BASED ON POLYESTER DIOLS FORMED FROM SUCCINIC ACID AND 1,3-PROPANEDIOL

(71) Applicant: Bayer Intellectual Property GmbH, Monheim (DE)

(72) Inventors: Wolfgang Bräuer, Leverkusen (DE); Yi Shen, Shanghai (CN); Wolfgang Kaufhold, Köln (DE); Hartmut Nefzger, Pulheim (DE)

(73) Assignee: Covestro Deutschland AG, Leverkusen (DE)

( * ) Notice: Subject to any disclaimer, the term of this patent is extended or adjusted under 35 U.S.C. 154(b) by 90 days.

(21) Appl. No.: 14/348,310

(22) PCT Filed: Sep. 27, 2012

(86) PCT No.: PCT/EP2012/069076
§ 371 (c)(1),
(2) Date: Mar. 28, 2014

(87) PCT Pub. No.: WO2013/045546
PCT Pub. Date: Apr. 4, 2013

(65) Prior Publication Data
US 2014/0256902 A1    Sep. 11, 2014

(30) Foreign Application Priority Data
Sep. 30, 2011 (DE) .................. 10 2011 083 813

(51) Int. Cl.
| C08G 18/34 | (2006.01) |
|---|---|
| C08G 18/66 | (2006.01) |
| C08G 18/76 | (2006.01) |
| C08G 18/10 | (2006.01) |
| C08G 18/42 | (2006.01) |

(52) U.S. Cl.
CPC ............ *C08G 18/341* (2013.01); *C08G 18/10* (2013.01); *C08G 18/4238* (2013.01); *C08G 18/664* (2013.01); *C08G 18/7671* (2013.01)

(58) Field of Classification Search
None
See application file for complete search history.

(56) References Cited

U.S. PATENT DOCUMENTS

| 3,642,964 A | 2/1972 | Rausch, Jr. et al. |
|---|---|---|
| 5,254,467 A | 10/1993 | Kretschmann et al. |
| 5,869,301 A | 2/1999 | Nghiem et al. |
| 2004/0198942 A1 | 10/2004 | Brauer et al. |
| 2007/0049719 A1 | 3/2007 | Brauer et al. |
| 2008/0221279 A1* | 9/2008 | Brauer ............... C08G 18/0895 525/457 |
| 2009/0189314 A1 | 7/2009 | Peerlings et al. |
| 2011/0166316 A1* | 7/2011 | Duwenhorst ........ C08G 18/664 528/74.5 |
| 2011/0306734 A1 | 12/2011 | Brauer et al. |
| 2012/0258269 A1 | 10/2012 | Gehringer et al. |

FOREIGN PATENT DOCUMENTS

| DE | 2059570 A1 | 6/1971 |
|---|---|---|
| DE | 1964834 A1 | 7/1971 |
| DE | 2901774 A1 | 7/1980 |
| EP | 0361082 A2 | 4/1990 |
| EP | 571830 A2 | 12/1993 |
| EP | 1391472 A1 | 2/2004 |
| EP | 1757632 A2 | 2/2007 |
| EP | 2083028 A1 | 7/2009 |
| EP | 2392602 A2 | 12/2011 |
| GB | 1057018 A | 2/1967 |
| WO | WO-2008/104541 A1 | 9/2008 |
| WO | WO-2010031792 A1 | 3/2010 |
| WO | WO-2011083000 A1 | 7/2011 |
| WO | WO-2011095446 A1 | 8/2011 |

OTHER PUBLICATIONS

International Search Report for PCT/EP2012/069076 mailed Dec. 3, 2012.

* cited by examiner

*Primary Examiner* — Jeffrey Washville
(74) *Attorney, Agent, or Firm* — K&L Gates LLP

(57) ABSTRACT

The present invention relates to homogeneous extruded articles made from thermoplastically processable polyurethanes based on polyester diols formed from succinic acid and 1,3-propanediol.

9 Claims, No Drawings

HOMOGENEOUS EXTRUDED ARTICLES MADE FROM THERMOPLASTICALLY PROCESSABLE POLYURETHANES BASED ON POLYESTER DIOLS FORMED FROM SUCCINIC ACID AND 1,3-PROPANEDIOL

RELATED APPLICATIONS

This application is a national stage application (under 35 U.S.C. §371) of PCT/EP2012/069076, filed Sep. 27, 2012, which claims benefit of German Application No. 10 2011 083 813.9, filed Sep. 30, 2011, which is incorporated by reference herein.

The present invention relates to homogeneous extruded items made of thermoplastically processable polyurethanes (TPUs) based on polyesterdiols made of succinic acid and 1,3-propanediol.

Thermoplastic polyurethane elastomers (TPUs) have been known for a long time. They are important technically because of the combination of a high level of mechanical properties with the known advantages of low-cost thermoplastic processability. Widely varying mechanical properties can be achieved by using different chemical structural components. An overview of TPUs and their properties and applications is found by way of example in Kunststoffe 68 (1978), pp. 819 to 825 or Kautschuk, Gummi, Kunststoffe 35 (1982), pp. 568 to 584.

TPUs are composed of linear polyols, mostly polyester or polyether polyols, of organic diisocyanates, and of short-chain diols (chain extenders). Catalysts can also be added in order to accelerate the formation reaction. The molar ratios of the structural components can be varied relatively widely in order to adjust properties. Molar ratios of polyols to chain extenders of from 1:1 to 1:12 have proven successful. Resultant products are in the range from 50 Shore A to 75 Shore D.

The TPUs can be produced continuously or batchwise. The best-known industrial production processes are the belt process (GB 1057018 A) and the extruder process (DE 1964834 A and DE 2059570 A).

Many different properties combinations can be achieved in a controlled manner by way of the polyols, and particular importance is naturally placed here on good mechanical properties for elastomers. The use of polyether polyols give TPUs particularly good hydrolysis properties. If good mechanical properties are desired, polyester polyols are advantageous.

Polyester polyols for TPUs are produced by way of example from dicarboxylic acids having from 2 to 12 carbon atoms, preferably from 4 to 6 carbon atoms, and from polyhydric alcohols such as glycols having from 2 to 10 carbon atoms, standard molecular weights used here for polyesters being from 500 to 5000. As is also described in EP 175 76 32 A2 for TPUs made of polyester polyols, use of a particular addition sequence of the monomers gives TPUs which provide particularly homogeneous moldings with particularly good shape retention.

WO 2008/104541 A describes how polyester alcohols are obtained by reacting alcohols that are at least dihydric with succinic acid which produced biologically via fermentation of carbohydrates. Dihydric alcohols selected are monoethylene glycol, diethylene glycol, monopropylene glycol, dipropylene glycol, 1,4-butanediol, 1,5-pentanediol, 1,6-hexanediol, 2-methyl-1,3-propanediol, 3-methyl-1,5-pentanediol, neopentyl glycol, glycerol, trimethylpropanediol, pentaerythritol, and sorbitol. Polyester alcohols based on 1,3-propanediol are not mentioned, and no restrictions or preferred ranges for the molecular weight of the polyester alcohols are mentioned. TPUs produced from said polyester alcohols are also claimed. In the examples, polyesters made of succinic acid, adipic acid, and ethylene glycol and butanediol with molecular weights of about 1900 are described and reacted to give TPUs, these having no particular properties, and average mechanical properties. The production of extruded items from said TPUs is not described.

WO 2010/031792 A describes polyurethanes based on a polyesterdiol with a dicarboxylic acid having an even number of C atoms and a diol having an odd number of C atoms. The dicarboxylic acid is preferably sebacic acid, the diol being 1,3-propanediol, and both polyester constituents here can also be of non-fossil origin. Transparent thermoplastic polyurethanes with particularly low glass transition temperature are obtained. Nothing is said about the production of particularly homogeneous extruded TPU items. It is also known that, because of phase separation, TPUs with particularly low glass transition temperature do not give homogeneous extruded items of good quality.

The prior art provides no guidance to the person skilled in the art as to which TPU is to be selected when the current intention is that TPUs that can be produced entirely or to some extent from components amenable to biological production are to be used to produce homogeneous extruded items.

It was therefore an object of the present invention to provide extruded items which can be produced from TPUs which can be produced entirely or to some extent from components amenable to biological production.

Surprisingly, said object is achieved via the use of thermoplastically processable polyurethane elastomers with hardness from 65 to 95 Shore A, determined in accordance with ISO868, these being obtainable from the following components:

a) one or more substantially linear polyesterdiols with functionality from 1.8 to 2.2,
b) one or more organic diisocyanates,
c) one or more diols with molar masses from 60 to 350 g/mol, where the molar NCO:OH ratio is set at from 0.9:1 to 1.1:1, and characterized in that that the substantially linear polyesterdiols a) are composed entirely or to some extent of succinic acid and of 1,3-propanediol and have an average molar mass of from 750 to 3500 g/mol.

"Molar NCO:OH" ratio here means the ratio of isocyanate groups b) to the hydroxy groups from a) and c) that are reactive toward isocyanate groups.

The expression "average molar mass" here and hereinafter refers to the number-average molar mass $\overline{M}_n$.

The hardness of the thermoplastically processable polyurethane elastomers used is from 65 to 95 Shore A, preferably from 75 to 95 Shore A, and particularly preferably from 80 to 95 Shore A. Shore hardness is the term in accordance with ISO868.

Examples of organic diisocyanates b) that can be used are aliphatic, cycloaliphatic, araliphatic, heterocyclic, and aromatic diisocyanates as described by way of example in Justus Liebigs Annalen der Chemie, 562, pp. 75 to 136.

Individual examples that may be mentioned are: aliphatic diisocyanates, such as hexamethylene diisocyanate, cycloaliphatic diisocyanates, such as isophorone diisocyanate, cyclohexane 1,4-diisocyanate, 1-methylcyclohexane 2,4-diisocyanate, and 1-methylcyclohexane 2,6-diisocyanate, and also the corresponding isomer mixtures, dicyclohexylmethane 4,4'-diisocyanate, dicyclohexylmethane 2,4'-diisocyanate, and dicyclohexylmethane 2,2'-diisocyanate, and also the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. It is preferable to use hexamethylene 1,6-diisocyanate, cyclohexane 1,4-diisocyanate, isophorone diisocyanate, dicyclohexylmethane diisocyanate, diphenylmethane diisocyanate isomer mixtures with more than 96% by weight content of diphenylmethane 4,4'-diisocyanate, diphenylmethane 4,4'-diisocyanate, and naphthylene 1,5-diisocyanate. The diisocyanates mentioned can be used individually or in the form of mixtures with one another. They can also be used together with up to 15 mol % (based on total diisocyanate) of a polyisocyanate, but the maximum permissible amount of polyisocyanate added is the amount that still gives a thermoplastically processable product. Examples of polyisocyanates are triphenylmethane 4,4',4"-triisocyanate and polyphenyl polymethylene polyisocyanates.

Polyesterdiols a) used are linear polyesterdiols. By virtue of the production process, these often comprise small amounts of nonlinear compounds. Another expression often used is therefore "substantially linear polyols". The functionality of "substantially" linear polyesterdiols is from 1.8 to 2.2 and preferably from 1.9 to 2.1.

Synthesis of the TPUs usually uses only one substantially linear polyesterdiol. However, it is also possible to use mixtures of more than one substantially linear polyesterdiol. Polyesterdiols, or else mixtures of a plurality of polyesterdiols to be used in the invention a) are composed of from 40 to 100% by weight, preferably from 90 to 100% by weight, and very particularly preferably entirely, of succinic acid and 1,3-propanediol, where the % by weight data are based on the total weight of the polyesterdiols used.

Preferred polyesterdiols, or mixtures of polyesterdiols, comprise from 40 to 100% by weight, preferably from 90 to 100% by weight (based on the total weight of all of the polyesterdiols used) of succinic acid 1,3-propionate. Succinic acid 1,3-propionate is composed of succinic acid and 1,3-propanediol.

The polyesterdiols to be used in the invention can be composed of other dicarboxylic acids alongside succinic acid, for example of dicarboxylic acids having from 3 to 12 carbon atoms, preferably from 4 to 6 carbon atoms, and of polyhydric alcohols. Examples of dicarboxylic acids that can be used are: aliphatic dicarboxylic acids such as glutaric acid, adipic acid, suberic acid, azelaic acid, and sebacic acid, or aromatic dicarboxylic acids, such as phthalic acid, isophthalic acid, and terephthalic acid. The dicarboxylic acids can be used individually or in the form of mixtures, e.g. in the form of a mixture of succinic, glutaric, and adipic acid. The polyesterdiols of the invention can also be composed of mixtures of a plurality of polyesterdiols where at least one of said polyesterdiols is composed entirely or to some extent of succinic acid and 1,3-propanediol.

Succinic acid can be produced by a petrochemical route, for example with use of maleic acid as starting compound, or can derive from biological sources.

If biological sources are utilized, it is possible to use carbohydrates which are converted into succinic acid via fermentation by a microbacterial route, as described by way of example in U.S. Pat. No. 5,869,301.

The polyesterdiols to be used in the invention can be composed of other polyhydric alcohols alongside 1,3-propanediol, for example of glycols having from 2 to 10, preferably from 2 to 6, carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 2-methyl-1,3-propanediol, 3-methyl-1,5-pentanediol, or dipropylene glycol. The alcohols can be used individually or in a mixture.

It is also possible to make concomitant use of, alongside the above, small amounts of up to 3% by weight, based on the total reaction mixture, of higher-functionality, low-molecular-weight polyols, e.g. 1,1,1-trimethylolpropane or pentaerythritol.

1,3-Propanediol can not only be produced by a petrochemical route, for example with use of acrolain as starting compound, but can also derive from biological sources: by way of example, 1,3-propanediol is obtained by a fermentation method from corn syrup on a large industrial scale by DuPont Tate & Lyle.

It is preferable to use exclusively bifunctional starting compounds for the production of the polyesterdiols.

Preferred polyesterdiols are produced with use of at least 90% by weight of biobased succinic acid (based on the total weight of the carboxylic acid or succinic acid used) and/or at least 90% by weight of biobased 1,3-propanediol (based on the total weight of the diol or propanediol used). It is very particularly preferable to use entirely biobased carboxylic acids or, respectively, succinic acid and entirely biobased 1,3-propanediol.

For the production of the polyesterdiols it can, where appropriate, be advantageous to use, instead of the dicarboxylic acids, the corresponding dicarboxylic acid derivatives, for example carboxylic diesters having from 1 to 4 carbon atoms in the alcohol moiety, for example dimethyl terephthalate or dimethyl adipate, carboxylic anhydrides, for example succinic anhydride, glutaric anhydride, or phthalic anhydride, or acyl chlorides.

It is also possible to make concomitant use of, alongside the above, small amounts of up to 3% by weight, based on the total reaction mixture, of higher-functionality, low-molecular-weight polyols, e.g. 1,1,1-trimethylolpropane or pentaerythritol.

Equally, it is possible by way of example when dimethyl esters of the dicarboxylic acids are used that as a consequence of not quite complete transesterification small amounts of unreacted methyl ester end groups reduce the functionality of the polyesters to less than 2.0, for example to 1.95, or else to 1.90.

The polycondensation takes place by methods known to the person skilled in the art, for example by first expelling the water of reaction at temperatures of from 150 to 270° C. under atmospheric pressure or slightly reduced pressure and subsequently slowly lowering the pressure, for example to from 5 to 20 mbar. A catalyst is in principle not required, but is normally very useful. By way of example, tin(II) salts, titanium(IV) compounds, bismuth(III) salts, and others can be used for this purpose.

It can moreover be advantageous to use an inert carrier gas, e.g. nitrogen, for expelling the water of reaction. Other methods that can be used alongside this are those using an entrainer that is liquid at room temperature, for example toluene, in an azeotropic esterification reaction.

The number-average molar masses $\overline{M}_n$ of the polyesterdiols in the invention are from 750 to 3500 g/mol, preferably from 750 to 1800 g/mol, equally preferred values being from 850 to 1800 g/mol, from 900 to 1800 g/mol, and from 900 to 1100 g/mol. Equally preferred ranges for the number-average molar mass $\overline{M}_n$ are from 1100 to 2400 g/mol, from 1100 to 1900 g/mol, from 1200 to 1800 g/mol, and also the ranges from 1800 to 2300 g/mol, from 2100 to 2400 g/mol, from 2400 to 3300 g/mol, from 2500 to 3300 g/mol, and from 2550 to 3300 g/mol.

Chain extenders c) used are diols, where appropriate blended with small amounts of diamines, with molar mass from 60 to 350 g/mol, preferably aliphatic diols having from 2 to 14 carbon atoms, e.g. ethanediol, 1,3-propanediol, 1,6-hexanediol, diethylene glycol, dipropylene glycol, ethylene glycol, and in particular 1,4-butanediol. However, other suitable compounds are diesters of terephthalic acid with glycols having from 2 to 4 carbon atoms, e.g. terephthalic acid-bis-ethylene glycol or terephthalic acid-bis-1,4-butanediol, hydroxyalkylene ethers of hydroquinone, e.g. 1,4-di(β-hydroxyethyl)hydroquinone, ethoxylated bisphenols, e.g. 1,4-di(β-hydroxyethyl)bisphenol A. The following are preferably used as chain extender: ethanediol, 1,3-propanediol, 1,4-butanediol, 1,6-hexanediol, 1,4-di((β-hydroxyethyl)hydroquinone. It is also possible to use mixtures of the abovementioned chain extenders. It is also possible to add, alongside the above, relatively small amounts of triols.

It is also possible to add small amounts of conventional monofunctional compounds, e.g. as chain terminators or mold-release agents. Examples that may be mentioned are alcohols, such as octanol and stearyl alcohol, or amines such as butylamine and stearylamine.

Addition of small amounts of chain terminator is advantageous in the TPUs used in the invention. It is preferable to use from 0.01 to 0.8% by weight, based on the total weight of the TPU.

The TPUs can be produced by reacting the structural components, where appropriate in the presence of catalysts, of auxiliaries, and/or of additives in amounts such that the equivalence ratio of NCO groups to the entirety of the groups reactive toward NCO is from 0.9:1.0 to 1.1:1.0, preferably from 0.95:1.0 to 1.02:1.0.

Suitable catalysts of the invention are the tertiary amines that are known from the prior art and are conventionally used, for example triethylamine, dimethylcyclohexylamine, N-methylmorpholine, N,N'-dimethylpiperazine, 2-(dimethylaminoethoxy)ethanol, diazabicyclo[2.2.2]octane, and the like, and also in particular organometallic compounds such as titanic esters, iron compounds, or tin compounds such as tin diacetate, tin dioctoate, tin dilaurate, or the dialkyl tin salts of aliphatic carboxylic acids, an example being dibutyltin diacetate or dibutyltin dilaurate, or the like. Preferred catalysts are organometallic compounds, in particular titanic esters, iron compounds, and tin compounds. The total amount of catalysts in the TPUs is generally about 0 to 5% by weight, preferably 0 to 1% by weight, based on TPU.

It is also possible to add auxiliaries and/or additives, alongside the TPU components and the catalysts. Examples that may be mentioned are lubricants, such as fatty acid esters, metal soaps of these, fatty acid amides, fatty acid ester amides, and silicone compounds, antiblocking agents, inhibitors, and stabilizers in respect of hydrolysis, light, heat, and discoloration, flame retardants, dyes, pigments, and inorganic and/or organic fillers and reinforcing agents. Reinforcing agents are in particular fibrous reinforcing agents such as inorganic fibers, which are produced in accordance with the prior art and which may also have been treated with a size. Nanoparticulate solids, e.g. carbon black in amounts of from 0 to 10% by weight can preferably also be added to the TPUs. Further details concerning the auxiliaries and additives mentioned can be found in the technical literature, for example in the monograph by J. H. Saunders and K. C. Frisch "High Polymers", volume XVI, Polyurethane [Polyurethanes], part 1 and 2, Verlag Interscience Publishers 1962 and 1964, Taschenbuch für Kunststoff-Additive [Handbook for plastics additives] by R. Gächter and H. Milner (Hanser Verlag, Munich, 1990), or DE-A 29 01 774.

Other additions which can be incorporated into the TPU are thermoplastics, for example polycarbonates and acrylonitrile/butadiene/styrene terpolymers, in particular ABS. It is also possible to use other elastomers such as rubber, ethylene/vinyl acetate copolymers, styrene/butadiene copolymers, and also other TPUs. Other materials suitable for incorporation are commercially available plasticizers such as phosphates, phthalates, adipates, sebacates, and alkyl sulfonic esters.

The TPU is produced in one stage (simultaneous addition of the reaction components=one shot) or in a plurality of stages (e.g. prepolymer process or the soft-segment preextension process of EP-A 571 830).

In one preferred production process, the TPU used in the invention is produced by means of a multistage process comprising soft-segment pre-extension, where
- A) one or more substantially linear polyesterdiols with functionality from 1.8 to 2.2 are reacted with a portion 1 of the organic diisocyanate or of the plurality of organic diisocyanates in a molar NCO/OH ratio of from 1.1:1 to 3.5:1, preferably from 1.3:1 to 2.5:1 to give a relatively high-molecular-weight isocyanate-terminated prepolymer ("NCO prepolymer"),
- B) the prepolymer obtained in stage A) is blended with a portion 2 of the organic diisocyanate or of the plurality of organic diisocyanates, where the entirety of portion 1 and portion 2 corresponds to the entire amount of diisocyanates used,
- C) the mixture obtained in stage B) is reacted with one or more diol chain extenders with molecular weights from 60 to 350, where the molar NCO:OH ratio resulting from the components used in A), B), and C) is set at from 0.9:1 to 1.1:1, and where the substantially linear polyesterdiols a) are composed entirely or to some extent of succinic acid and of 1,3-propanediol, and have an average molar mass of from 750 to 3500 g/mol.

It is preferable that the organic diisocyanates of the portion 1 used in step A) are the same as the organic diisocyanates in the portion 2 used in step B). In a second preferred production process,
- A) one or more linear polyesterdiols with functionality from 1.8 to 2.2 are reacted with the organic diisocyanate to give an isocyanate-terminated prepolymer,
- B) the prepolymer obtained in stage A) is reacted with one or more diol chain extenders with molecular weights from 60 to 350, where the molar NCO:OH ratio resulting from the components used in A) and B) is set at from 0.9:1 to 1.1:1, and where the substantially linear polyesterdiols a) are composed entirely or to some extent of succinic acid and of 1,3-propanediol, and have an average molar mass of from 750 to 3500 g/mol.

In a third preferred production process, one or more linear polyesterdiols with functionality from 1.8 to 2.2 are reacted with the organic diisocyanate, and simultaneously with the one or more diol chain extenders with molecular weights from 60 to 350, where the molar NCO:OH ratio resulting from the components used is set at from 0.9:1 to 1.1:1, and where the substantially linear polyesterdiols a) are composed entirely or to some extent of succinic acid and of 1,3-propanediol, and have an average molar mass of from 750 to 3500 g/mol.

Irrespective of the process used, the molar ratio of the NCO groups to the OH groups is set overall, across all of the stages, to from 0.9:1 to 1.1:1.

The known mixing assemblies are suitable for the production of the TPUs, preference being given to those that operate with high shear energy. Examples that may be mentioned for continuous production are co-kneaders, and preferably extruders, for example twin-screw extruders and Buss kneaders, or static mixers.

The TPUs of the invention are processed in the invention via the familiar thermal forming processes for plastics, e.g. by means of melt extrusion, to give homogeneous extruded items, in particular foils (flat film or blown-film extruder), hoses, cables, profiles.

Extrusion processing features non-aggressive melting of the TPU in a compounding screw, often a single-flight three-section screw, and shaping through an appropriate extrusion die. Processing within a low temperature range permits achievement of high dimensional stability, the melt temperatures being dependent on hardness and product type. They are generally in the range from 160 to 230° C. Under these non-aggressive conditions, homogeneous melting is particularly important and is substantially determined by the product profile of the TPU. If said melting does not take place homogeneously, it generally has optical and technical shortcomings in the extrudates (undispersed particles, holes), which cause interruption of the process.

Extrusion processes of this type are described in general terms in Polyurethane Handbook (Hanser Verlag; edited by G. Oertel; p. 426).

The use of the TPUs described above can produce homogeneous extruded items which can be based entirely or to some extent on components amenable to biological production.

EXAMPLES

Production of the TPUs

In each case, a polyol is used as initial charge in a reaction vessel as in table 1. Bisethylenestearylamide (0.3% by weight, based on TPU) and Stabaxol 1-LF (monomeric carbodiimide from Rhein-Chemie/1% by weight, based on polyol) were in each case dissolved therein. After heating to 180° C., portion 1 of the diphenylmethane 4,4'-diisocyanate (MDI) was added, with stirring, and the prepolymer reaction (prep) was carried out to a conversion of more than 90 mol % (determined via titration of the remaining NCO groups), based on the polyol, with the aid of 50 ppm (based on the amount of polyol) of tin dioctoate catalyst.

After the reaction had ended, portion 2 of the MDI was introduced, with stirring. The amount stated in table 1 of 1,4-butanediol chain extender was then added, the NCO/OH ratio of all of the components being 1.00. In what is known as one-shot addition (os), all of the polyurethane components were added simultaneously.

After intensive mixing, the TPU reaction mixture was poured out onto a metal sheet and conditioned at 120° C. for 30 minutes. The cast sheets were chopped and granulated.

Polyols: BP=polyesterdiols based on succinic acid 1,3-propionate

SP=polyesterdiols based on sebacic acid 1,3-propionate.
Sebacic acid 1,3-propionate is composed of sebacic acid and 1,3-propanediol.

TABLE 1

| Ex. | Polyol | Molecular weight Mn of polyol | Amount of polyol (mol) | MDI portion 1 (mol) | MDI portion 2 (mol) | Butanediol (mol) | Addition method |
|---|---|---|---|---|---|---|---|
| 1 | BP | 1080 | 1.00 | 2.78 | 0.06 | 1.84 | prep |
| 2 | BP | 1080 | 1.00 | 2.78 | 0.82 | 2.60 | prep |
| 3 | BP | 2000 | 1.00 | 2.00 | 2.74 | 3.74 | prep |
| 4 | BP | 2000 | 1.00 | 4.84 | 0 | 3.84 | prep |
| 5 | BP | 2000 | 1.00 | 4.84 | 0 | 3.84 | os |
| 6 | BP | 3000 | 1.00 | 1.50 | 3.55 | 4.05 | prep |
| 7* | SP | 2000 | 1.00 | 4.41 | 0 | 3.41 | prep |

*non-inventive comparative example

Production of Injection Moldings:

The TPU granules obtained were melted in an All-rounder 470 S injection-molding machine (30 mm screw) from Arburg and molded to give S1 specimens (mold temperature: 25° C.; specimen size: 115×25/6×2), sheets (mold temperature: 25° C.; size: 125×50×2 mm), or round stoppers (mold temperature: 25° C.; diameter 30 mm, thickness 6 mm).

Foil Processing:

The granules were melted in a 30/25D single-screw extruder (Plasticorder PL 2000 6 from Brabender) (feed rate 3 kg/h; from 170 to 235° C.) and extruded through a flat-film head to give a flat film.

Tests

The hardness test was carried out in accordance with ISO 868 on the abovementioned round stoppers. The measurements in the tensile test were made in accordance with ISO 527-1,-3 on S1 specimens, and gave 100% modulus, ultimate tensile strength and tensile strain.

Dynamic-Mechanical Analysis (DMA) Over Temperature Range

A dynamic-mechanical test was in each case carried out on a test specimen (50 mm×12 mm×2 mm) punched out of the injection-molded sheet, using the vibratory elasticity test (1 Hz) across a temperature range by analogy with DIN 53 445. The tests were carried out with a DMS6100 from Seiko at 1 Hz in the temperature range from −125° C. to 250° C. with a heating rate of 2° C./min. Table 2 gives the glass transition temperature Tg in order to characterize softening behavior in the invention. Said temperature was determined from the maximum of the loss modulus curve. Table 2 describes the properties measured in the examples:

| Example | Shore A hardness | 100% modulus, MPa | Ultimate tensile strength, MPa | Tensile strain at break, % | Glass transition temperature from DMA, ° C. | Extrusion of flat film |
|---|---|---|---|---|---|---|
| 1 | 91 | 13 | 40 | 476 | 2 | good |
| 2 | 94 | 22 | 41 | 434 | 11 | good |
| 3 | 91 | 9 | 42 | 619 | −9 | good |
| 4 | 94 | 11 | 54 | 524 | −6 | good |
| 5 | 94 | | | | −6 | good |
| 6 | 85 | 10 | 39 | 732 | −18 | good |
| 7* | 90 | 8 | 45 | 516 | −39 | poor |

*non-inventive comparative example

The TPU of the invention, based on succinic acid 1,3-propionate and produced by various addition methods, is seen to have an increased glass transition temperature and, with this, to have good extrudability.

What is claimed is:

1. A method comprising preparing a thermoplastically processable polyurethane elastomer with hardness from 65 to 95 Shore A, determined in accordance with ISO 868, obtained from the components consisting of:
   a) one or more substantially linear polyesterdiol with functionality from 1.8 to 2.2,
   b) one or more organic diisocyanate,
   c) one or more diol with a molar mass from 60 to 350 g/mol,
   where the molar NCO:OH ratio is set at from 0.9:1 to 1.1:1,
   and wherein the substantially linear polyesterdiol a) consists of succinic acid and of 1,3-propanediol and has an average molar mass of from 750 to 3500 g/mol.

2. An extruded item essentially consisting of a thermoplastically processable polyurethane elastomer with hardness from 65 to 95 Shore A, determined in accordance with ISO 868, obtained from the components consisting of:
   a) one or more substantially linear polyesterdiol with functionality from 1.8 to 2.2,
   b) one or more organic diisocyanate,
   c) one or more diol with a molar mass from 60 to 350 g/mol,
   where the molar NCO:OH ratio is set at from 0.9:1 to 1.1:1,
   and wherein the substantially linear polyesterdiol a) consists of succinic acid and of 1,3-propanediol and has an average molar mass of from 750 to 3500 g/mol.

3. The extruded item as claimed in claim 2, wherein at least one of components a) and c) has been produced entirely or to some extent biologically.

4. The extruded item as claimed in claim 2, wherein the organic diisocyanate b) is selected from one or more isocyanates from the group consisting of diphenylmethane 4,4'-diisocyanate, isophorone diisocyanate, dicyclohexylmethane 4,4-diisocyanate, hexamethylene 1,6-diisocyanate, and naphthylene 1,5-diisocyanate.

5. The extruded item as claimed in claim 2, wherein the diol c) is selected from the group consisting of 1,4-butanediol, 1,3-propanediol, ethylene 1,2-glycol, and 1,6-hexanediol.

6. The extruded item as claimed in claim 2, wherein the succinic acid in the polyesterdiol is produced biologically by fermentation of carbohydrates.

7. The extruded item as claimed in claim 2, wherein the 1,3-propanediol used in the polyesterdiol has been produced biologically via fermentation of carbohydrates.

8. The extruded item as claimed in claim 2, wherein the diol comprises a biologically produced 1,3-propanediol.

9. A process for the production of an extruded item as claimed in claim 2 comprising extruding the thermoplastically processable polyurethane elastomers with hardness from 65 to 95 Shore A, determined in accordance with ISO 868, obtained from the components consisting of:
   a) one or more substantially linear polyesterdiols with functionality from 1.8 to 2.2,
   b) one or more organic diisocyanates,
   c) one or more diols with molar masses from 60 to 350 g/mol,
   where the molar NCO:OH ratio is set at from 0.9:1 to 1.1:1,
   and wherein the substantially linear polyesterdiols a) consists of succinic acid and of 1,3-propanediol and have an average molar mass of from 750 to 3500 g/mol.

* * * * *